F. CONRAD.
ELECTRICAL REGULATOR.
APPLICATION FILED APR. 24, 1911.

1,146,927.

Patented July 20, 1915.

WITNESSES:
C. L. Belcher
Otto S. Schairer

INVENTOR
Frank Conrad
BY
[signature]
ATTORNEY

UNITED STATES PATENT OFFICE.

FRANK CONRAD, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL REGULATOR.

1,146,927.

Specification of Letters Patent.  Patented July 20, 1915.

Application filed April 24, 1911. Serial No. 623,035.

*To all whom it may concern:*

Be it known that I, FRANK CONRAD, a citizen of the United States, and a resident of Pittsburgh, in the county of Allegheny and State of Pennsylvania, have invented a new and useful Improvement in Electrical Regulators, of which the following is a specification.

My invention relates to electrical regulators, and particularly to such regulators as are employed for regulating the voltage of a generator.

The object of my invention is to provide a regulator of the character indicated which shall be simple in construction, effective to prevent hunting or fluctuations of the generator voltage, and independent of the exciter voltage in its operation, so that it is adapted for use with either direct or alternating current generators that are either self or separately excited.

Figure 1:
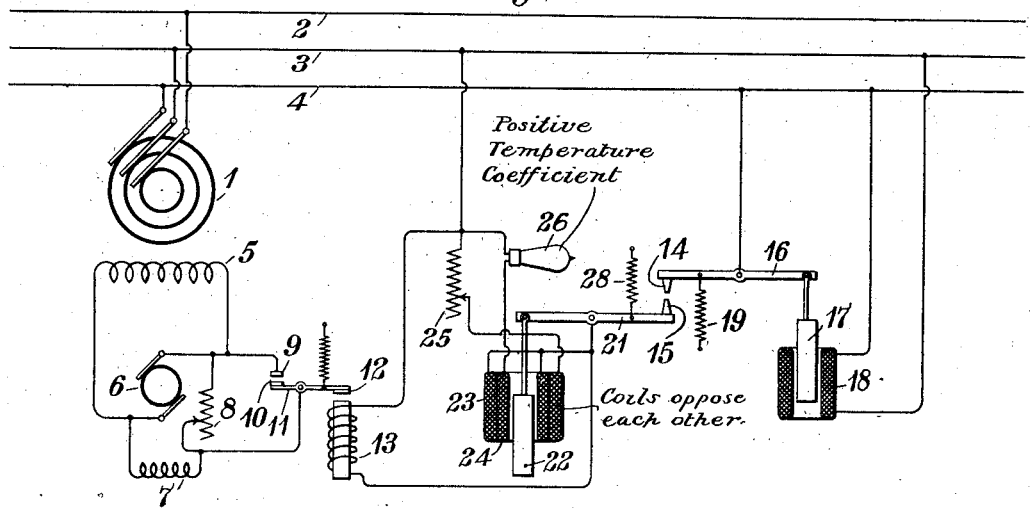
Figure 2:
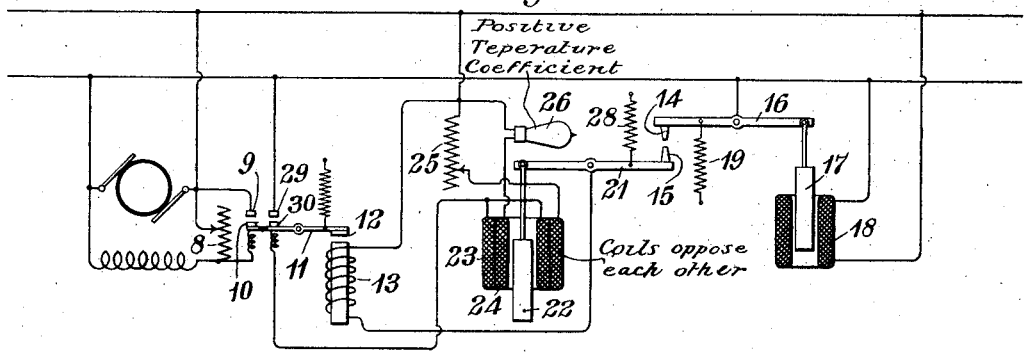
Figure 3:
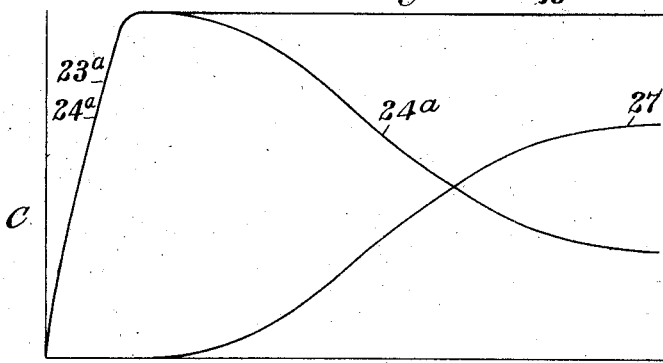

Figure 1 of the accompanying drawing is a diagrammatic view of a system embodying my invention, Fig. 2 is a similar view of a modification of the system shown in Fig. 1, and Fig. 3 is a diagram of curves relating to the operation of my invention.

In Fig. 1, an alternating current generator 1, for supplying current to a circuit 2—3—4, is provided with a field magnet winding 5 that is separately excited from an exciter 6 having a field magnet winding 7. The field strength of the exciter is adjusted by opening and closing a shunt circuit to a resistance 8, that is connected in series with the exciter field winding 7, by means of a relay device comprising a stationary contact terminal 9 and a coöperating movable contact terminal 10 that is mounted upon one end of a pivoted arm 11 having an armature 12 at its opposite end. The armature 12 is periodically attracted and released by an electromagnet having a winding 13, the circuit of which is governed by two coöperating movable contact members 14 and 15, the current for energizing the said winding being derived from conductors 3 and 4 of the distributing circuit. The contact terminal 14 is mounted upon a pivoted arm 16 carrying at its opposite end an armature or core 17 of an electro-magnetic actuating device having a coil 18, that is connected to the distributing circuit conductors 3 and 4, and is, therefore, energized in accordance with variations of the voltage of the distributing circuit. A spring 19 tends to maintain the contact terminal 14 in engagement with the contact terminal 15, in opposition to the coil 18. The arm 16 is connected to one of the distributing circuit conductors, such as 4. The contact member 15 is carried by a pivoted arm 21 that also carries an armature or core 22 of an electromagnetic actuating device which comprises, further, two parallel-connected differential coils 23 and 24, the said coils being connected between the arm 21 and one of the distributing circuit conductors, such as 3. The circuits of the coils 23 and 24, are, accordingly, governed by the contact terminals 14 and 15. In series with the coil 23, is a resistance 25 of any suitable character, but preferably a non-inductive resistance having a low temperature co-efficient, that is, one having a substantially uniform specific resistance at varying temperatures, so that the current will remain of substantially uniform value after it has once risen to its full value. In series with the coil 24, is another suitable resistance, such as a tungsten incandescent lamp, having a different temperature co-efficient from the resistance 25, the said resistance being preferably of such a character that current traversing the same will quickly rise to a maximum value and then gardually fall to a lower uniform value with continued application of current. The best conditions of operation will also be secured if the currents traversing the two resistances 25 and 26 attain their maximum values substantially at the same rate and simultaneously.

In order to clearly illustrate the character of the resultant magnetization of the coils 23 and 24, the diagram of Fig. 3 has been prepared, in which curves 23ª and 24ª, respectively, represent the changes of current values in the coils 23 and 24 after sudden but continued applications of current thereto. It will be seen that the two curves are substantially coincident during a short interval of application of current to the coils, but that, after the said currents have attained their maximum values, the current traversing the coil 24 gradually becomes less while that traversing the coil 23 remains uniform. Since the coils are differentially connected, that is, in opposition, the resultant magnetization will follow a curve corresponding to the differences of the cur- 110"

rents represented respectively by the curves 23ª and 24ª. The other curve 27 upon the diagram of Fig. 3 is such a curve, and it will be seen therefrom that the resultant magnetization slowly and gradually rises to its maximum value. The resistances 25 and 26 are preferably so selected that the curve 27 also represents substantially the changes of the exciter voltage or generator field strength upon an increase of the field strength of the exciter. However, it is not essential that this curve should exactly follow such changes, it being sufficient if the resultant magnetization varies in substantially the same manner and in the same direction as the exciter voltage or generator field strength.

In order that the operation of the regulator may be explained, let it first be assumed that the various parts occupy the positions substantially as shown in Fig. 1 and that the voltage of the distributing circuit is diminished. The pull of the coil 18 upon the core 17 is then also diminished and the spring 19 draws the terminal member 14 into engagement with the member 15. The circuits of the coils 13, 23 and 24 are thus established and the contact terminals 9 and 10 are brought into engagement, with the result that the resistance 8 in the exciter field circuit is shunted. The exciter field strength is thus increased and such increase is accompanied by a corresponding but succeeding increase of the generator field strength and voltage, which latter tends to compensate for the diminution of voltage previously mentioned.

Upon establishment of the circuits of the coils 23 and 24, the resultant magnetization thereof rises gradually, substantially as represented by the curve 27 of Fig. 3, and, accordingly, after an interval, depending upon the shape of the curve 27, the core 22 is drawn upwardly and the terminal member 15 is thereby withdrawn from engagement with the member 14. As soon as the said members have become disengaged from each other, the spring 28 causes them to reëngage, the said spring being preferably of such a character that the pull or force necessary to distend it rapidly increases as it is distended. The operation will continue as thus described and the terminal member 14 will be caused by the coil 18 to occupy, or fluctuate slightly with reference to, a position that is dependent upon the voltage of the distributing circuit, so that the relative duration of periods of engagement and disengagement of the terminal members 14 and 15 will depend upon the distributing circuit voltage.

The regulator may be employed not only in connection with alternating current generators, but in connection with direct current generators, as shown in Fig. 2, in which the exciter is omitted. In order to relieve the contact members 14 and 15 from the necessity of interrupting the circuits of the coils 23 and 24, and also of the arcing incident thereto, the relay that is operated by the coil 13 may be provided with an additional set of contact members 29 and 30 for that purpose, the said members being better adapted to the particular service since they are actuated more positively and caused more definitely to engage and disengage. Otherwise, the regulator is the same as shown in Fig. 1 and its operation is also the same.

Many other modifications of the system and regulator may, of course, be made without departing from the spirit of the invention, and it is not considered necessary or desirable to illustrate or describe the same.

I claim as my invention:

1. A regulator comprising two coöperating movable contact members, an actuating winding for one of said members, and differential actuating windings for the other member the circuits of which are governed by the said members, and resistances differing in character and respectively in circuit with the differential windings.

2. A regulator comprising two coöperating movable contact members, an actuating winding for one of said members, and differential actuating windings for the other member the circuits of which are governed by the said members, and non-inductive resistances differing in character and respectively in circuit with the differential windings.

3. A regulator comprising two coöperating movable contact members, an actuating winding for one of said members, and differential actuating windings for the other member the circuits of which are governed by the said members, and resistances having different temperature co-efficients and respectively in circuit with the differential windings.

4. A regulator comprising two coöperating movable contact members, an actuating winding for one of said members, and differential actuating windings for the other member the circuits of which are governed by the said members, and non-inductive resistances having different temperature co-efficients and respectively in circuit with the differential windings.

5. A regulator comprising two coöperating movable contact members, an actuating winding for one of said members and differential actuating windings for the other member having circuits the resistances of which have different temperature coefficients.

6. A regulator comprising two coöperating movable contact members, an actuating winding for one of said members, and differential actuating windings for the other member having circuits the resistances of which differ in character, the circuits of the differential windings being governed by the contact members.

7. A regulator comprising two coöperating movable contact members, an actuating winding for one of said members and differential actuating windings for the other member having circuits the resistances of which have different temperature coefficients, the circuits of the differential windings being governed by the contact members.

8. The combination with a circuit and a dynamo-electric machine associated therewith, of a regulator for said machine comprising two coöperating movable contact members, an actuating winding for one of said members, and differential actuating windings for the other member the circuits of which are governed by the said members, all of said windings being energized from said circuit.

9. The combination with a circuit and a dynamo-electric machine associated therewith, of a regulator for said machine comprising two coöperating movable contact members, an actuating winding for one of said members, and differential actuating windings for the other member having circuits the resistances of which differ in character, all of said windings being energized from said circuit.

10. The combination with a main circuit and a dynamo-electric machine associated therewith, of a regulator for said machine comprising two coöperating movable contact members, an actuating winding for one of said members, and differential actuating windings for the other member having circuits the resistances of which differ in character, the circuits of the differential windings being governed by the contact members and all of the windings being energized from said main circuit.

11. The combination with a main circuit and a dynamo-electric machine associated therewith, of a regulator for said machine comprising two coöperating movable contact members, an actuating winding for one of said members, and differential actuating windings for the other member having circuits the resistances of which have different temperature coefficients, all of said windings being energized from said main circuit.

12. The combination with a circuit and a dynamo-electric machine associated therewith, of a regulator for said machine comprising two coöperating movable contact members, an actuating winding for one of said members, and differential actuating windings for the other member having circuits the resistances of which have different temperature coefficients, the circuits of the differential windings being governed by the contact members and all of the windings being energized from said circuit.

13. The combination with a generator, and a means for exciting the same, of a regulator comprising two coöperating movable contact members, an actuating winding for one of said members, differential actuating windings for the other member, and means independent of the exciting means for the generator for causing the resultant magnetizing effect of the differential windings to vary substantially in accordance with the exciting force.

14. The combination with a generator, and a means for exciting the same, of a regulator comprising two coöperating movable contact members, an actuating winding for one of said members, differential actuating windings for the other member, the circuits of which are governed by the contact members, and means independent of the exciting means for the generator for causing the resultant magnetizing effect of the differential windings to vary substantially in accordance with the exciting force.

15. The combination with a generator and means for exciting the same, of means for producing a force that varies similarly to, but independently of, the exciting force, and means for regulating the generator responsive to variations of said force and of an electrical condition of the generator.

16. The combination with an electrical circuit, a dynamo-electric machine associated therewith, and means for exciting the dynamo-electric machine, of a regulator for varying the excitation of said machine comprising means for producing a force that varies similarly to, but independently of, the exciting force, and means responsive to variations of the said force and of an electrical condition of said current.

In testimony whereof, I have hereunto subscribed my name this 21st day of April, 1911.

FRANK CONRAD.

Witnesses:
B. B. Hines,
Jas. L. Adams, Jr.

Copies of this patent may be obtained for five cents each, by addressing the "Commissioner of Patents, Washington, D. C."

Correction in Letters Patent No. 1,146,927.

It is hereby certified that in Letters Patent No. 1,146,927, granted July 20, 1915, upon the application of Frank Conrad, of Pittsburgh, Pennsylvania, for an improvement in "Electrical Regulators," an error appears in the printed specification requiring correction as follows: Page 3, line 105, claim 16, for the word "current" read *circuit;* and that the said Letters Patent should be read with this correction therein that the same may conform to the record of the case in the Patent Office.

Signed and sealed this 21st day of September, A. D., 1915.

[SEAL.]

J. T. NEWTON,
*Acting Commissioner of Patents.*